(12) United States Patent
Jang et al.

(10) Patent No.: US 8,597,453 B2
(45) Date of Patent: Dec. 3, 2013

(54) METHOD FOR PRODUCING HIGHLY CONDUCTIVE SHEET MOLDING COMPOUND, FUEL CELL FLOW FIELD PLATE, AND BIPOLAR PLATE

(75) Inventors: Bor Z. Jang, Centerville, OH (US); Aruna Zhamu, Centerville, OH (US); Lulu Song, Centerville, OH (US)

(73) Assignee: Manotek Instriments, Inc., Dayton, OH (US)

( * ) Notice: Subject to any disclaimer, the term of this patent is extended or adjusted under 35 U.S.C. 154(b) by 1540 days.

(21) Appl. No.: 11/293,541

(22) Filed: Dec. 5, 2005

(65) Prior Publication Data

US 2007/0125493 A1 Jun. 7, 2007

(51) Int. Cl.
*H01M 8/02* (2006.01)

(52) U.S. Cl.
USPC .......... 156/209; 156/242; 156/247; 156/249; 429/507

(58) Field of Classification Search
None
See application file for complete search history.

(56) References Cited

U.S. PATENT DOCUMENTS

| | | |
|---|---|---|
| 5,300,370 A | 4/1994 | Washington et al. |
| 5,527,363 A | 6/1996 | Wilkinson et al. |
| 5,885,728 A | 3/1999 | Mercuri et al. |
| 6,037,073 A | 3/2000 | Besmann et al. |
| 6,171,720 B1 | 1/2001 | Besmann et al. |
| 6,248,467 B1 | 6/2001 | Wilson et al. |
| 6,508,906 B1 * | 1/2003 | Bradish .......... 156/285 |
| 6,881,512 B2 | 4/2005 | Saito et al. |
| 6,939,638 B2 | 9/2005 | Saito et al. |
| 7,338,573 B2 * | 3/2008 | Boudouris et al. ........ 156/244.11 |
| 2002/0132152 A1 * | 9/2002 | Saito et al. ........ 429/32 |
| 2003/0143452 A1 * | 7/2003 | Ito et al. .......... 429/34 |
| 2004/0229993 A1 | 11/2004 | Huang et al. |
| 2005/0031933 A1 * | 2/2005 | Blunk et al. ........ 429/35 |
| 2007/0065703 A1 * | 3/2007 | Abd Elhamid et al. ........ 429/34 |

* cited by examiner

*Primary Examiner* — Barbara J Musser
(74) *Attorney, Agent, or Firm* — Mark Levy; Thompson Hine LLP

(57) ABSTRACT

This invention provides a method of producing a highly electrically conductive sheet molding compound (SMC) composition and a fuel cell flow field plate or bipolar plate made from such a composition. The plate exhibits a conductivity typically greater than 100 S/cm and more typically greater than 200 S/cm. In one preferred embodiment, the method comprises: (a) providing a continuous sheet of a substrate material (bottom sheet) and a continuous sheet of flexible graphite (top sheet) from respective rollers; (b) feeding a resin mixture (comprising a thermoset resin and a conductive filler) to a space between the top sheet and the bottom sheet in such a way that the resin mixture forms a uniform core layer sandwiched between the two sheets to obtain a laminated structure; (c) compressing the laminated structure to obtain a SMC composition having two opposite outer surfaces; and (e) impressing a fluid flow channel to either or both of the outer surfaces (e.g., via embossing or matched-die molding) and curing the thermoset resin to obtain the plate.

28 Claims, 9 Drawing Sheets

Heating/curing zone

Heating/curing zone

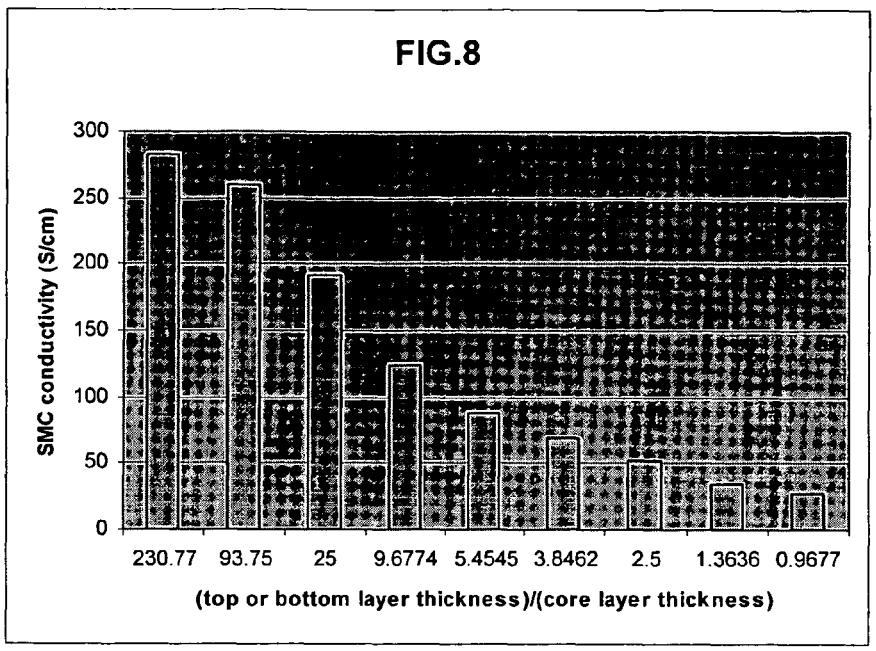

METHOD FOR PRODUCING HIGHLY CONDUCTIVE SHEET MOLDING COMPOUND, FUEL CELL FLOW FIELD PLATE, AND BIPOLAR PLATE

The present invention is based on the research results of a project supported by the NSF SBIR-STTR Program. The US government has certain rights on this invention.

FIELD OF THE INVENTION

The present invention provides a method of producing a sheet molding compound (SMC) for use in a fuel cell bipolar plate or flow field plate. In particular, it relates to a roll-to-roll method of producing a flexible graphite-based, highly electrically conductive SMC and SMC-based flow field plates or bipolar plates for use in a proton exchange membrane fuel cell.

BACKGROUND OF THE INVENTION

A fuel cell converts chemical energy into electrical energy and some thermal energy by means of a chemical reaction between a fuel (e.g., hydrogen gas or a hydrogen-containing fluid) and an oxidant (e.g., oxygen). A proton exchange membrane (PEM) fuel cell uses hydrogen or hydrogen-rich reformed gases as the fuel, a direct-methanol fuel cell (DMFC) uses methanol-water solution as the fuel, and a direct ethanol fuel cell (DEFC) uses ethanol-water solution as the fuel, etc. These types of fuel cells that require utilization of a PEM layer as a proton transport electrolyte are collectively referred to as PEM-type fuel cells.

A PEM-type fuel cell is typically composed of a seven-layered structure, including (a) a central PEM electrolyte layer for proton transport; (b) two electro-catalyst layers on the two opposite primary surfaces of the electrolyte membrane; (c) two fuel or gas diffusion electrodes (GDEs, hereinafter also referred to as diffusers) or backing layers stacked on the corresponding electro-catalyst layers (each GDE comprising porous carbon paper or cloth through which reactants and reaction products diffuse in and out of the cell); and (d) two flow field plates (or a bi-polar plate) stacked on the GDEs. The flow field plates are typically made of graphite, metal, or conducting composite materials, which also serve as current collectors. Gas-guiding channels are defined on a GDE facing a flow field plate or, more typically, on a flow field plate surface facing a GDE. Reactants (e.g., $H_2$ or methanol solution) and reaction products (e.g., $CO_2$ at the anode of a DMFC, and water at the cathode side) are guided to flow into or out of the cell through the flow field plates. The configuration mentioned above forms a basic fuel cell unit. Conventionally, a fuel cell stack comprises a number of basic fuel cell units that are electrically connected in series to provide a desired output voltage. If desired, cooling channels and humidifying plates may be added to assist in the operation of a fuel cell stack.

In one common practice, a fuel flow field plate and an oxidant gas flow field plate are separately made and then assembled together to form a bipolar plate (one side of a bipolar plate serving as a negative terminal and the other side as a positive terminal, hence the name). In some cases, an additional separator is sandwiched between the two flow field plates to form a bipolar plate. It would be highly advantageous if the flow filed plates and the separator can be mass-produced into an integrated bipolar plate assembly. This could significantly reduce the overall fuel cell production costs and reduce contact ohmic losses across constituent plate interfaces. The bipolar plate is known to significantly impact the performance, durability, and cost of a fuel cell system. The bipolar plate, which is typically machined from graphite, is one of the most costly components in a PEM fuel cell.

Fluid flow field plates have open-faced channels formed in one or both opposing major surfaces for distributing reactants to the gas diffuser plates (the anode and cathode backing layers, typically made of carbon paper or fabric). The open-faced channels also provide passages for the removal of reaction products and depleted reactant streams. Optionally, a bipolar plate may have coolant channels to manage the fuel cell temperature. A bipolar plate should have the following desirable characteristics: high electrical conductivity (e.g., preferably having a conductivity no less than 100 S/cm), low permeability to fuel or oxidant fluids, good corrosion resistance, and good structural integrity.

Conventional methods of fabricating fluid flow field plates require the engraving or milling of flow channels into the surface of rigid plates formed of a metal, graphite, or carbon-resin composite. Such plates are expensive due to high machining costs. The machining of channels into the graphite plate surfaces causes significant tool wear and requires significant processing times. Metals can be readily shaped into very thin plates, but long-term corrosion is a major concern. A corrosion-resistant coating may be used, but it has to be applied perfectly. The coating may also increase contact resistance.

Alternatively, fluid flow field plates can be made by a lamination process (e.g., U.S. Pat. No. 5,300,370, issued Apr. 5, 1994), wherein an electrically conductive, fluid impermeable separator layer and an electrically conductive stencil layer are consolidated to form one open-faced channel. Presumably, two conductive stencil layers and one separator layer may be laminated to form a bipolar plate. It is often difficult and time-consuming to properly position and align the separator and stencil layers. Die-cutting of stencil layers require a minimum layer thickness, which limits the extent to which fuel cell stack thickness can be reduced. Such laminated fluid flow field assemblies tend to have higher manufacturing costs than integrated plates, due to the number of manufacturing steps associated with forming and consolidating the separate layers. They are also prone to delamination due to poor interfacial adhesion and vastly different coefficients of thermal expansion between a stencil layer (typically a metal) and a separator layer.

A variety of composite bipolar plates have been developed, which are mostly made by compression molding of polymer matrices (thermoplastic or thermoset resins) filled with conductive particles such as graphite powders or fibers. Because most polymers have extremely low electronic conductivity, excessive conductive fillers have to be incorporated, resulting in an extremely high viscosity of the filled polymer melt or liquid resin and, hence, making it very difficult to process. Bi-polar plates for use in PEM fuel cells constructed of graphite powder/fiber filled resin composite materials and having gas flow channels are reviewed by Wilson, et al (U.S. Pat. No. 6,248,467, Jun. 19, 2001). Injection-molded composite-based bipolar plates are disclosed by Saito, et al. (U.S. Pat. No. 6,881,512, Apr. 19, 2005 and U.S. Pat. No. 6,939,638, Sep. 6, 2005). These thermoplastic or thermoset composites exhibit a bulk conductivity significantly lower than 100 S/cm (the US Department of Energy target value), typically not much higher than 10 S/cm.

Besmann, et al. disclosed a carbon/carbon composite-based bipolar plate (U.S. Pat. No. 6,171,720 (Jan. 9, 2001) and U.S. Pat. No. 6,037,073 (Mar. 14, 2000)). The manufacture process consists of multiple steps, including production of a carbon fiber/phenolic resin preform via slurry molding, followed by a compression-molding step. The molded part is then pyrolyzed at a high temperature (1,500° C.-2,500° C.) to obtain a highly porous carbon/carbon composite. This is followed by chemical vapor infiltration (CVI) of a carbon matrix into this porous structure. It is well-known that CVI is a very time-consuming and energy-intensive process and the resulting carbon/carbon composite, although exhibiting a high electrical conductivity, is very expensive.

Instead of using pyrolyzation and CVI to produce carbon/carbon composites, Huang, et al. (US Patent Application Pub. No. 2004/0229993, Nov. 18, 2004) discloses a process to produce a thermoplastic composite with a high graphite loading. First, polymer fibers, such as thermotropic liquid crystalline polymers or polyester, reinforcing fibers such as glass fibers, and graphite particles are combined with water to form a slurry. The slurry is pumped and deposited onto a sieve screen. The sieve screen serves the function of separating the water from the mixture of polymer fibers, glass fibers and graphite. The mixture forms a wet-lay sheet which is placed in an oven. Upon heating to a temperature sufficient to melt the polymer fibers, the wet-lay sheet is allowed to cool and have the polymer material solidify. Upon solidification, the wet-lay sheet takes the form of a sheet material with reinforcement glass fibers held together by globules of thermoplastic material, and graphite particles adhered to the sheet material by the thermoplastic material. Several of these sheets are then stacked, preferably with additional graphite powder interspersed between sheets, and compression-molded in a hot press. After application of heat and pressure in the press, one or more formed bipolar plates are obtained, where the bipolar plates are a composite of glass fibers, thermoplastic matrix and graphite particles. Clearly, this is also a tedious process which is not amenable to mass production.

Alternatively, fluid flow field plates can be made from an electrically conductive, substantially fluid impermeable material that is sufficiently compressible or moldable so as to permit embossing. Flexible graphite sheet is generally suitable for this purpose because it is relatively impervious to typical fuel cell reactants and coolants and thus is capable of isolating the fuel, oxidant, and coolant fluid streams from each other. It is also compressible and embossing processes may be used to form channels in one or both major surfaces. The "flexible graphite" is the exfoliated reaction product of rapidly heated natural graphite particles which have been treated with an agent that intercalates into the crystal structure of the graphite to expand the intercalated particles at least 80 or more times (up to 1000 times) in the direction perpendicular to the carbon layers in the crystal structure. The exfoliated graphite particles are vermiform in appearance, and are therefore commonly referred to as worms. The worms may be compressed together into flexible sheets which, unlike the original graphite flakes, can be formed and cut into various shapes. These thin sheets (foils or films) are hereinafter referred to as flexible graphite. Flexible graphite can be wound up on a drum to form a roll of thin film, just like a roll of thin plastic film or paper.

Although flexible graphite sheets are highly conductive, they by themselves do not have sufficient stiffness and must be supported by a core layer or impregnated with a resin. For example, U.S. Pat. No. 5,527,363 (Jun. 18, 1996) discloses a fluid flow field plate comprising a metal sheet interposed between two flexible graphite (FG) sheets having flow channels embossed on a major surface thereof. These FG-metal-FG laminates are also subject to the delamination or blistering problem, which could weaken the plate and may make it more fluid permeable. Delamination or blistering can also cause surface defects that may affect the flow channels on the plate. These problems may be difficult to detect during fabrication and may only emerge at a later date. In particular, thermal cycling between frozen and thawed states, as are likely to be encountered in an automobile application of the fuel cell, often results in delamination between a flexible graphite layer and the metal layer. Alternatively, Mercuri, et al. (U.S. Pat. No. 5,885,728, Mar. 23, 1999) discloses a flexible graphite sheet having embedded ceramic fibers extending from its surface into the sheet to increase the resin permeability of the sheet for the preparation of a resin-impregnated flexible graphite bipolar plate. The step of adding ceramic fibers significantly increases the process complexity and cost.

The flow field plate or bipolar plate should be constructed from inexpensive starting materials, materials that are easily formed into any plate configuration, preferably using a continuous molding process, and materials that are corrosion resistant in low temperature fuel cells and that do not require further processing such as high temperature pyrolyzation treatments. Any laminated or multi-layer plate should have adequate bonding between layers to ensure structural integrity and reduced contact resistance (reduced power loss due to joule heating).

Accordingly, an object of the present invention is to provide a method of producing a highly conductive sheet molding compound (SMC) composition and a fuel cell flow field plate or bipolar plate from this SMC composition. The method uses a fast and cost-effective roll-to-roll process. The process can be automated and adaptable for mass production. The resulting bipolar plate has the flexible graphite serving as the top and/or bottom sheets, which are bonded by an electrically conductive resin mixture. The resulting fuel cell component is highly conductive and, hence, can be as a current collector in a fuel cell with reduced contact resistance.

SUMMARY OF THE INVENTION

One embodiment of the prevent invention is a method for producing a sheet molding compound (SMC) composition, particularly for use as a fuel cell flow field plate or bipolar plate. The SMC composition comprises a top sheet, a bottom sheet, and a resin mixture sandwiched between the top sheet and the bottom sheet. At least one of the top sheet and bottom sheet comprises a flexible graphite sheet. The flexible graphite sheet has a planar outer surface having formed therein a fluid flow channel. The resin mixture comprises a thermoset resin and a conductive filler present in a sufficient quantity to render the SMC composition electrically conductive enough to be a current collector material. When the resin is cured or solidified, the two sheets are well bonded by the resin to provide good structural integrity to the resulting "laminated" structure.

As a first embodiment, the method comprises: (a) providing a continuous sheet of a substrate material (the bottom sheet), preferably from a roller or drum; (b) feeding a resin mixture to a surface of the substrate material sheet; (c) providing a continuous sheet of flexible graphite (the top sheet) onto the resin mixture in such way that the resin mixture forms a core layer sandwiched between the substrate material sheet and the flexible graphite sheet to obtain a laminated structure; and (d) compressing the laminated structure (for facilitating filler-resin mixing) to obtain the SMC composition which is collected on a winding device, such as a motorized roller. This is a roll-to-roll process that is amenable to mass production of SMC.

When both the top and bottom sheets are flexible graphite, bonded by an electrically conductive resin mixture, the resulting three-layer plate can be used as a bipolar plate that is interposed between two fuel cell units. In this case, each flexible graphite sheet has a substantially planar outer surface having fluid flow channels molded therein. These flow channels are preferably created through embossing during or after the SMC is made on a continuous basis.

If only one sheet (say, the top sheet) is flexible graphite and the bottom sheet is a sheet of plastic material (plastic film), the flexible graphite sheet and the plastic sheet may be laminated initially into a three-layer SMC plate. A mold release agent may be used between the plastic sheet and the resin mixture layer to facilitate later separation of the plastic sheet from the resin mixture-bonded flexible graphite plate. Embossing or matched-mold pressing is carried out before, during, and/or after resin curing to produce flow channels on the outer surface of the flexible graphite sheet. The plastic sheet or film is then peeled off, leaving behind a two-layer plate that can be used as a flow field plate.

Another embodiment of the present invention is a method of producing a SMC-based flow field plate or bipolar plate, comprising a top sheet, a bottom sheet, and a resin mixture sandwiched between the top sheet and the bottom sheet. The method is similar to that described in the first embodiment, but with an added step of impressing a fluid flow channel to either or both of the outer surfaces of the laminated structure and curing the thermoset resin to obtain the plate. The top sheet and/or the bottom sheet comprises a flexible graphite sheet. The resin mixture comprises a thermoset resin and a conductive filler present in a sufficient quantity to render the resin mixture electrically conductive with a bulk conductivity of the resin mixture (after curing) no less than 10 S/cm (preferably no less than 50 S/cm). The resulting three-layer SMC composition (after resin curing or molding) has a conductivity typically above 100 S/cm, which is the US Department of Energy (DOE) target for composite bipolar plates. In many cases, the SMC conductivity exceeds 200 S/cm and, in some cases, exceeds 250 S/cm, which are quite impressive.

In the aforementioned SMCs, the conductive filler comprises a conductive material selected from the group consisting of carbon fibers, metal fibers, carbon nano-tubes, graphitic nano-fibers, nano-scaled graphene plates, carbon blacks, metal particles, and combinations thereof. The conductive material being present in an amount of at least about 3% by weight (preferably at least 20% by weight), based on total weight of the resin mixture. Preferably, the SMC composition as defined above has a resin mixture having a thickness no greater than $1/15$ of the sum of the top sheet thickness and the bottom sheet thickness.

BRIEF DESCRIPTION OF THE DRAWING

FIG. 8: SMC bipolar plate conductivity as a function of top layer-to-resin mixture layer thickness ratio for the first set of examples.

DETAILED DESCRIPTION OF THE INVENTION

Figure 1:
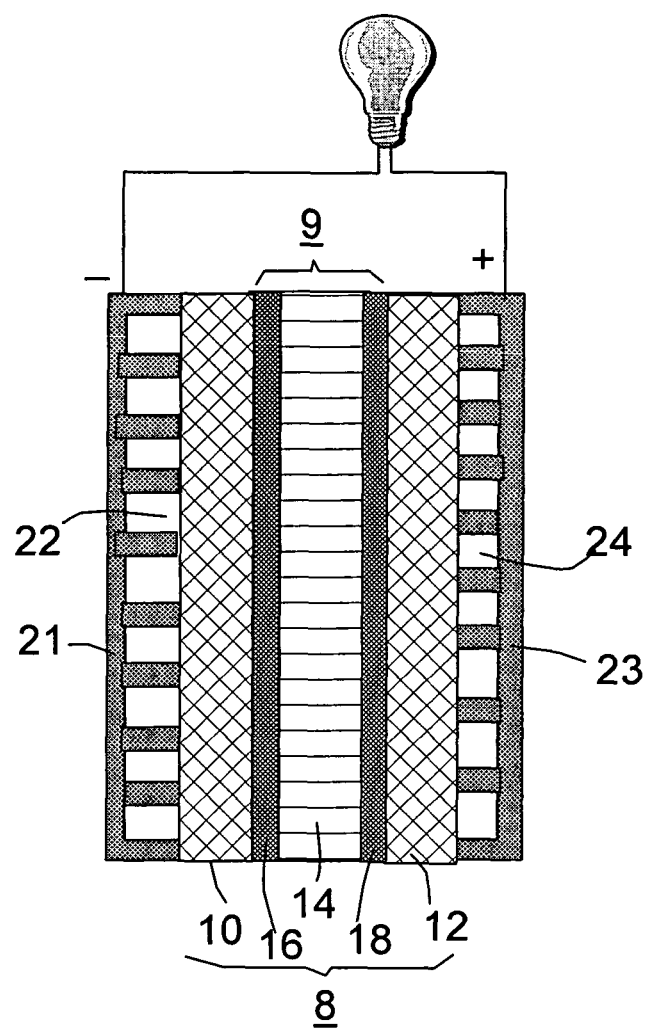
FIG. 1: A sectional view of a prior art PEM fuel cell consisting of a membrane electrode assembly (MEA) sandwiched between two flow field plates 21, 23.

A prior art fuel cell, as shown in FIG. 1, typically comprises a membrane electrode assembly 8, which comprises a proton exchange membrane 14 (PEM), an anode backing layer 10 connected to one face of the PEM 14, and a cathode backing layer 12 connected to the opposite face of PEM 14. Anode backing layer 10 is also referred to as a fluid diffusion layer or diffuser, typically made of carbon paper or carbon cloth. A platinum/ruthenium electro-catalytic film 16 is positioned at the interface between the anode backing layer and PEM 14 for promoting oxidation of the methanol fuel. Similarly, at the cathode side, there are a backing layer or diffuser 12 (e.g., carbon paper or carbon cloth) and a platinum electro-catalytic film 18 positioned at the interface between the cathode backing layer and PEM 14 for promoting reduction of the oxidant.

In practice, the proton exchange membrane in a PEM-based fuel cell is typically coated on both sides with a catalyst (e.g., Pt/Ru or Pt) to form a catalyst-coated membrane 9 (CCM). The CCM layer 9 is then sandwiched between an anode backing layer 10 (diffuser) and a cathode backing layer 12 (diffuser). The resulting five-layer assembly is called a membrane electrode assembly 8 (MEA). Although some fuel cell workers sometimes refer to CCM as a MEA, we prefer to take the MEA to mean a five-layer configuration: anode backing layer, anode catalyst layer, PEM, cathode catalyst layer, and cathode backing layer.

The fuel cell also comprises a pair of fluid distribution plates (also referred to as fluid flow field plates) 21 and 23, which are positioned on opposite sides of membrane electrode assembly 8. Plate 21, which serves as a fuel distribution plate, is shaped to define fuel flow channels 22 facing towards anode diffuser 10. Channels 22 are designed to uniformly deliver the fuel to the diffuser, which transports the fuel to the anode catalyst layer 16. An input port and an output port (not shown), being in fluid communication with channels 22, may also be provided in flow field plate 21 so that carbon dioxide (in a DMFC) can be withdrawn from channels 22.

Figure 2:
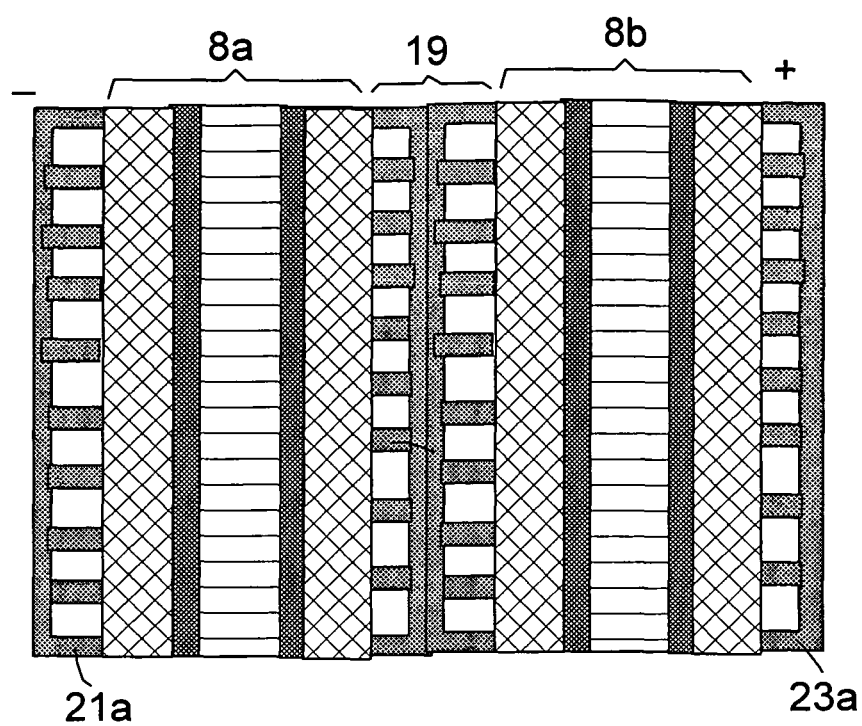
FIG. 2: A sectional view of a fuel cell stack consisting of two fuel cell units connected in series through a bipolar plate 19.

Flow field plate 23 is shaped to include fluid channels 24 for passage of a quantity of gaseous oxygen (or air). An input port and an output port (not shown) are provided in plate 23, which are in fluid communication with channels 24 so that oxygen (or air) can be transported through the input port to the cathode diffuser 12 and cathode catalyst layer 18, and water and excess oxygen (or air) can be withdrawn from channels 24 through the output port. Plate 23 is electrically conductive and in electrical contact with cathode diffuser 12. It can be used as a uni-polar plate (the positive terminal of the electrical current generated by the fuel cell unit) or as a part of a bi-polar plate (if integrated with fuel flow field plate 21). Shown in FIG. 2 is a fuel cell stack that consists of two fuel cell units. On the two opposite sides of the stack are two separate flow field plates 21a, 23a. Between the two MEAs (8a and 8b) is a bipolar plate 19, which can be viewed as two flow field plates integrated into one single component.

In the manufacture of fiber reinforced resin composite products, conventional (prior art) sheet molding compounds (SMCs) are frequently used which consist of a mixture of a viscous uncured thermosetting resin and chopped fibers, such as glass fibers. In most cases the resin and chopped fibers are sandwiched between films of plastic material to form a laminated structure which is wound in coiled form. The laminate is stored under conditions which will not result in final curing of the resin. At the time of use, the laminate is uncoiled and cut to the desired size and shape for the molding operation. As the resin which is employed to provide the sheet molding compound is relatively viscous, specific procedures must be employed to provide a thorough impregnation of fibers with the resin. Impregnation can be achieved by passing the laminated structure between cooperating rolls or flexing the laminate in concave and convex shapes. These prior art SMC composites do not have a sufficient electrical conductivity for flow field plate or bipolar plate applications.

The present invention provides a method of producing a highly conductive SMC composition and a fuel cell flow field plate or bipolar plate made from this SMC composition. The SMC composition, prior to shaping and curing into a flow field or bipolar plate, is a laminated structure comprising a top sheet, a bottom sheet and a core layer sandwiched between these two sheets. After molding, the SMC-based bipolar plate, schematically shown in FIG. 3(a), comprises a top sheet 71, a bottom sheet 73, and a resin mixture 75 sandwiched between the top sheet and the bottom sheet. At least one of the top sheet and the bottom sheet comprises a flexible graphite sheet. The flexible graphite sheet (e.g., the top sheet 71) has a planar outer surface 77 having formed therein a fluid flow channel 79. The resin mixture 75 comprises a thermoset resin (with or without a catalyst) and a conductive filler present in a sufficient quantity to render the SMC composition electrically conductive enough to be a current collector material (with a conductivity of the SMC preferably no less than 100 S/cm). When the resin is cured or solidified, the two sheets 71,73 are well bonded by the resin to provide good structural integrity to the resulting "laminated" structure. The thermoset resin can be any resin which, upon exposure to heat or high energy radiation (e.g., electron beam), becomes cured (e.g., forming a cross-linked polymer chain network). The thermoset resin may be advantageously selected from the group consisting of unsaturated polyester resins, vinyl esters, epoxies, phenolic resins, polyimide resins, bismaleimide resins, polyurethane resins, and combinations thereof.

Basically, in one preferred embodiment, the method for producing a SMC composition for use as a fuel cell flow field plate or bipolar plate material comprises: (a) providing a continuous sheet of a substrate material (becoming the bottom sheet), preferably from a roller or drum; (b) feeding a resin mixture to a surface of the substrate material sheet with the resin mixture comprising a thermoset resin and a conductive filler; (c) providing a continuous sheet of flexible graphite (becoming the top sheet) onto the resin mixture in such way that the resin mixture forms a core layer sandwiched between the substrate material sheet and the flexible graphite sheet to obtain a laminated structure; and (d) compressing the laminated structure (for facilitating filler-resin mixing) to obtain the SMC composition which is collected on a winding device, such as a motorized roller. This is a roll-to-roll process that is amenable to mass production of SMC.

Figure 3A:
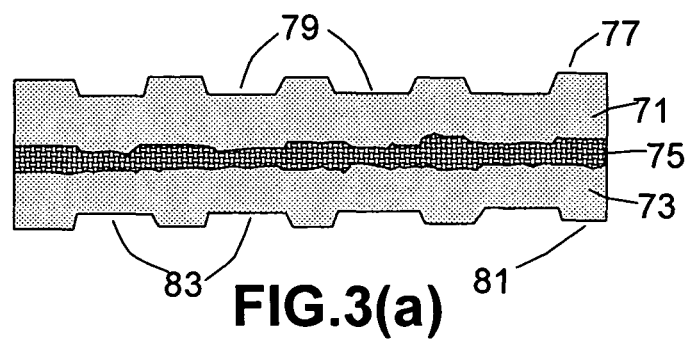
FIG. 3: A sectional view of (a) a bipolar plate consisting of a top flexible graphite layer, a bottom flexible graphite layer, and a core resin-mixture layer; (b) a flow field plate consisting of a top flexible graphite layer, a core resin mixture layer, and a plastic film as a tentative bottom layer; and (c) a flow field plate with the plastic film peeled off.

In one preferred embodiment (FIG. 3(a)), when both the top and bottom sheets are flexible graphite and are bonded by an electrically conductive resin mixture, the resulting three-layer plate can be used as a bipolar plate that is interposed between two fuel cell units. In this case, each flexible graphite sheet has a substantially planar outer surface (e.g., surface 77 on the top sheet 71 and surface 81 on the bottom sheet 73) having fluid flow channels (e.g., channel 79 on the top sheet and 83 on the bottom sheet) molded therein. These flow channels are preferably created through embossing during or after the SMC plate is made on a continuous basis.

The conductive filler in the resin mixture may be selected from small-sized particles (preferably smaller than 10 μm and more preferably smaller than 1 μm) such as a carbon black, graphite particle, nano-scaled graphene plate, graphitic nano-fiber, metal particle, or a combination thereof. When a thicker resin mixture layer (also hereinafter referred to as the core layer) is allowed or desired, carbon or graphite fibers (fiber diameter typically greater than 12 μm) may also be used, alone or in conjunction with the aforementioned small-sized particles. A second thermoset resin or a thermoplastic may be used to adjust the mixture viscosity and to assist in bonding the filler particles together. Although not necessarily preferred, a quantity of other types of reinforcement fiber, such as glass fiber or polymer fiber, may be added to impart additional structural integrity to the resin mixture layer and that of the SMC.

The type and proportion of the conductive filler are preferably chosen in such a way that the bulk conductivity of the resulting resin mixture is greater than 10 S/cm, further preferably greater than 50 S/cm, and most preferably greater than 100 S/cm. Typically, when the conductive filler proportion in the resin mixture is between 3% and 20% by weight (based on the total weight of the resin mixture), the bulk conductivity of the resin mixture exceeds 10 S/cm, up to approximately 35 S/cm, depending on the filler type. When the proportion is between approximately 20% and 45%, the resin matrix conductivity exceeds 50 S/cm. When the proportion is greater than 45%, the resin matrix conductivity exceeds 100 S/cm. This has led to SMC plates having an overall conductivity mostly greater than 100 S/cm, typically greater than 200 S/cm, and, in many cases, even greater 250 S/cm, far exceeding the US Department of Energy conductivity target (100 S/cm) for composite bipolar plates.

Figure 3B:
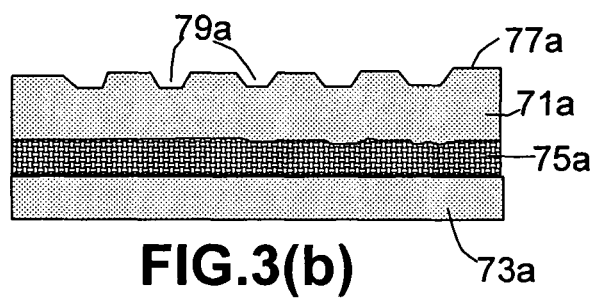

If only one sheet (say, the top sheet 71a) is flexible graphite and the bottom sheet is a sheet of plastic material (plastic film 73a), the flexible graphite sheet and the plastic sheet may be laminated initially into a three-layer SMC structure (FIG. 3(b)). A mold release agent may be used between the plastic sheet and the resin mixture layer to facilitate later separation of the plastic sheet from the resin mixture-bonded flexible graphite plate. Embossing or matched-mold pressing is carried out before, during, and/or after resin curing to produce flow channels 79a on the outer surface 77a of the flexible graphite sheet 71a. The plastic sheet or film 73a is then peeled off, leaving behind a two-layer plate (FIG. 3(c)) that can be used as a flow field plate.

In one embodiment of the present invention, the top sheet is a flexible graphite foil, but the bottom sheet can be an electrically conductive film or foil, such as a carbon paper, carbon or graphite fabric, conductive polymer film, or metal foil. This will also make a good bipolar plate. In another preferred embodiment, both the top and bottom sheets can be selected from a carbon paper, carbon/graphite fabric, carbon/graphite fiber-containing mat, conductive polymer film, thin metal foil and/or flexible graphite. In theses cases, a portion of the thermoset resin in the resin mixture of the core layer can permeate into the top or bottom layer to further enhance the structural integrity of the resulting laminate.

The overall conductivity of a two-layer flow field plate or a three-layer bipolar plate also depends upon the relative thickness of the resin matrix layer (or core layer) with respect to the total thickness of the flexible graphite sheets. Since the flexible graphite is highly conductive (typically with a conductivity greater than 300 S/cm) and the resin matrix layer is typically lower than flexible graphite in conductivity, the resin matrix layer should be made as thin as possible to achieve a maximum electronic conductivity. When the resin matrix conductivity is relatively low (e.g., 10 S/cm), a ratio of core layer thickness-to-total flexible graphite thickness typically is as small as 1/15 in order to achieve a bipolar plate conductivity of 100 S/cm or greater. With both of the top and bottom layers being each 0.3 mm (300 μm) thick, the resin mixture layer is thinner than 40 μm. In order to obtain a bipolar plate conductivity of 200 S/cm, the resin mixture layer has to be lower than 10 μm. However, a certain minimum core layer thickness may be desired to obtain a desired level of mechanical stiffness or strength of the bipolar plate.

By contrast, if the resin matrix conductivity is higher (e.g., 50 S/cm), a much higher ratio of core layer thickness-to-total flexible graphite thickness can be used in order to achieve a bipolar plate conductivity of 100 S/cm. In this case, the resin mixture layer can be almost as thick as a flexible graphite sheet. More advantageously, when each flexible graphite sheet is approximately 300 μm thick and when the resin mixture layer is 60 μm or thinner, a bipolar plate conductivity as high as 200 S/cm can be achieved. A resin matrix layer of approximately 60 μm can be prepared quite easily. The above observations will be further illustrated when examples are given at a later section.

Electrically conductive and corrosion resistant materials are useful for other applications (e.g., battery electrodes) than fuel cells. Hence, the presently invented SMCs have a wide range of applications. Thus, another embodiment of the present invention is a sheet molding compound composition, comprising a top sheet, a bottom sheet, and a resin mixture sandwiched between the top sheet and the bottom sheet. The top sheet and/or the bottom sheet comprises a flexible graphite sheet. The resin mixture comprises a thermoset resin and a conductive filler present in a sufficient quantity to render the resin mixture electrically conductive with a bulk conductivity of the resin mixture no less than 10 S/cm (preferably no less than 50 S/cm). The resulting three-layer SMC composition, upon completion of resin curing to make a SMC product, has a conductivity mostly above 100 S/cm, typically above 200 S/cm, and, in several cases, above 250 S/cm.

As indicated earlier, the conducting filler material may be selected from carbon fibers, metal fibers, metal particles (preferably nano-scaled), carbon nano-tubes (CNTs), graphitic nano-fibers (GNFs), nano-scaled graphene plates, carbon blacks, or a combination thereof. Individual nano-scaled graphite planes (individual graphene sheets) and stacks of multiple nano-scaled graphene sheets are collectively called nano-sized graphene plates (NGPs). The structures of these materials may be best visualized by making a longitudinal scission on the single-wall or multi-wall of a nano-tube along its tube axis direction and then flattening up the resulting sheet or plate. These nano materials have strength, stiffness, and electrical conductivity that are comparable to those of carbon nano-tubes, but NGPs can be mass-produced at lower costs. They can be produced by reducing the expanded graphite particles to much smaller sizes (100 nanometers or smaller). The preparation of other nano-scaled carbon-based materials, including CNTs, GNFs, and carbon black, is well-known in the art. They are all commercially available, along with nano-scaled metal particles. These nano-scaled, electrically conductive filler materials are preferred conductive filler ingredients for use in making the presently invented SMCs. It may be further noted that CNTs, GNFs, and NGPs are known to be capable of imparting high strength and stiffness to a resin matrix. They are ideally suited for the present applications.

Figure 4A:
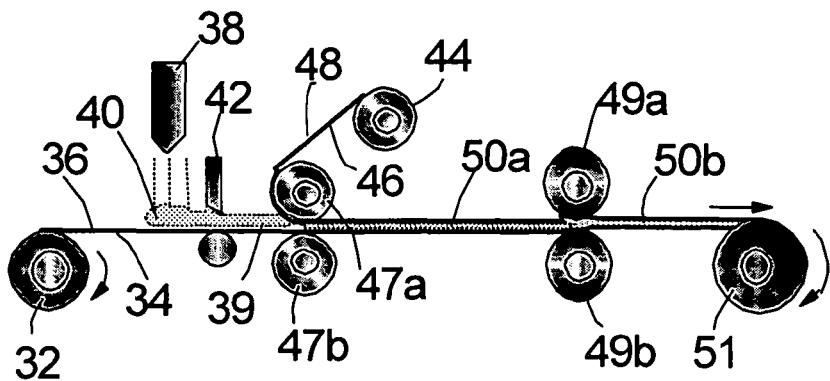
FIG. 4: (a) Schematic of a roll-to-roll process for preparing a highly conductive sheet molding compound (SMC); (b) schematic of a process for fabricating SMC-based flow field plates or bipolar plates with the surface flow channels being generated via in-line embossing or matched-die molding; (c) Schematic of another embodiment of the presently invented roll-to-roll process for preparing a highly conductive SMC; and (d) schematic of a continuous process for fabricating SMC-based flow field plates or bipolar plates with the surface flow channels being generated via in-line embossing or matched-die molding.

Referring to FIG. 4(a) as an example, the preparation of a flexible graphite SMC composition may begin with continuously or intermittently feeding (uncoiling) a thin flexible graphite sheet 34 (a bottom sheet in the present context) from a winding drum 32. The surface of the flexible graphite sheet 34 may be coated (or pre-coated) with a desired layer 36 of an uncured thermoset resin via a number of prior art coating techniques (e.g., spraying, printing, spin-coating, or, simply, brushing). A powder dispenser 38 is then operated to deposit a desired amount of a conductive filler 40 (or conductive filler plus some resin) onto the top surface of the thermoset resin layer 36 while the flexible graphite sheet is being driven forward to the right. It may be noted that the conductive filler is typically a mixture of conductive particles and fibers (non-conductive or, preferably, conductive). A leveling device 42 (e.g., a scraping blade) is used to form a uniform-thickness layer 39 of a resin-filler premix. Concurrently, another flexible graphite sheet 46 (a top sheet), also coated or pre-coated with a thermoset resin layer 48 (with same or different composition), is similarly fed from a drum 44 in such a way that the resin layer 48 comes in contact with the premix 39 to form a three-layer pre-SMC composition. This laminated pre-SMC composition is then fed through the gap between a pair of rollers 47a,47b to compress the composition 50a. A series of rollers (e.g., between 47a,47b and 49a, 49b) are used to assist in mixing of the resin with the conductive filler. Specifically, impregnation or mixing of the filler particles/fibers with the resin can be achieved by passing the laminated structure 50a between cooperating rolls or flexing the laminate in concave and convex shapes to obtain a well-mixed SMC 50b, which can be wound up on a roller 51. The SMC may be stored under conditions which will not result in final curing of the resin. A catalyst inhibitor may be used to extend the shelf or storage life of the SMC without premature curing. When a flow field plate or bipolar plate is needed, the SMC is uncoiled and cut to the desired size and shape for the molding operation. Compression molding, hot pressing, or matched-die molding may be used to create flow channels on the outer surfaces of the plate while the thermoset resin is being cured and hardened.

Figure 4B:
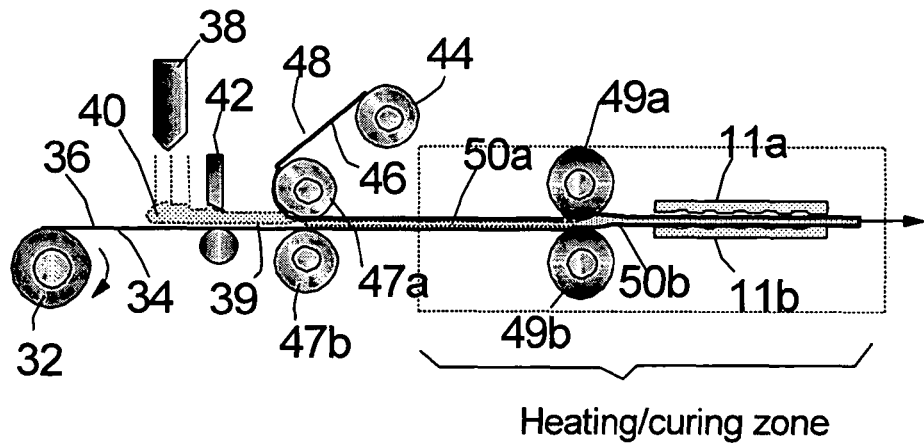

Alternatively or preferably, as schematically shown in FIG. 4(b), a continuous sheet of SMC is fabricated in a procedure similar to that in FIG. 4(a). Heating means may be used to advance the cure reaction of the thermoset resin (e.g., in a heating zone indicated by a phantom box of FIG. 4(b)) to achieve a desired degree of curing before the SMC is embossed or match-molded between a pair of embossing tools 11a,11b or matting mold platens to create the desired flow field channels. These tools or mold platens may also be heated. As the laminated sheet (50a or 50b) continues to move forward, another portion of the sheet is embossed or molded. This is a continuous process that is suitable for cost-effective mass production of flow field plates or bipolar plates that are highly conductive.

Figure 3C:
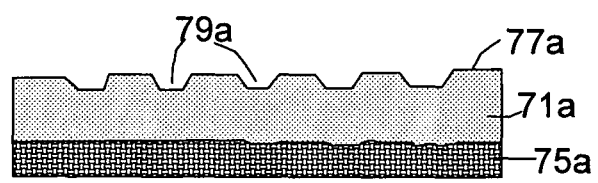
Figure 5A:
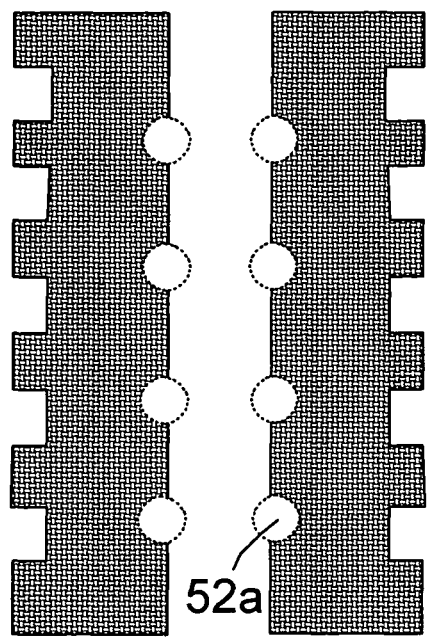
FIG. 5: (a) Schematic of two matting flow field plates each with half of the coolant channels; (b) the two plates, after being molded with the thermoset resin cured, are combined to form a bi-polar plate with coolant channels.
Figure 5B:
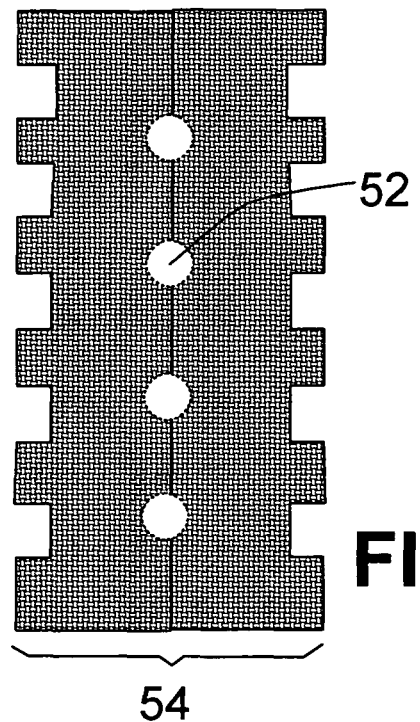

If one of the flexible sheets (either 34 or 46) is a plastic film, this film may be peeled off after resin is cured to obtain a flow field plate (e.g., FIG. 3(c). If coolant channels are needed, they can be created during the SMC molding process in several ways. For instance, during the flow field plate molding process, the mold surface may be shaped to produce a part of a channel groove (e.g., 52a in FIG. 5(a)). Two matting flow field plates may then be positioned together to form a bipolar plate 54 (FIG. 5(b)) having complete coolant channels (e.g., 52).

In the presently invented method, the ingredients may be artificially divided into two categories: (a) nano-scale fillers (e.g., CNTs, GNFs and NGPs for both structural reinforcement and conductivity enhancement of the thermoset resin, and nano-scale metal particles, carbon black powder, and nano-scaled graphite particles mainly for conductivity enhancement) and (b) micron-diameter or larger fillers (chopped glass fibers for structural reinforcement, micron or larger graphite particles for conductivity enhancement, and short carbon/graphite fibers for both structural reinforcement and conductivity enhancement). There are two basic input forms of micron-diameter fibers for being incorporated into the conductive filler-resin mixture: a multi-end roving (strands of continuous fibers), and pre-cut short fibers (typically micron to mm in length).

There are three basic routes of combining the ingredients of a resin mixture together:

(1) As illustrated in FIGS. 4(a) and 4(b), the thermoset resin and the filler may be supplied in three separate components and then combined and mixed.

(2) Mixing all of the filler ingredients with a thermoset resin to form a resin-filler (e.g., in a static mixer), which is then made into a thin sheet. This thin sheet of resin mixture is then transferred to be sandwiched between a top sheet and a bottom sheet of a selected flexible material to form a laminated SMC.

Figure 4C:
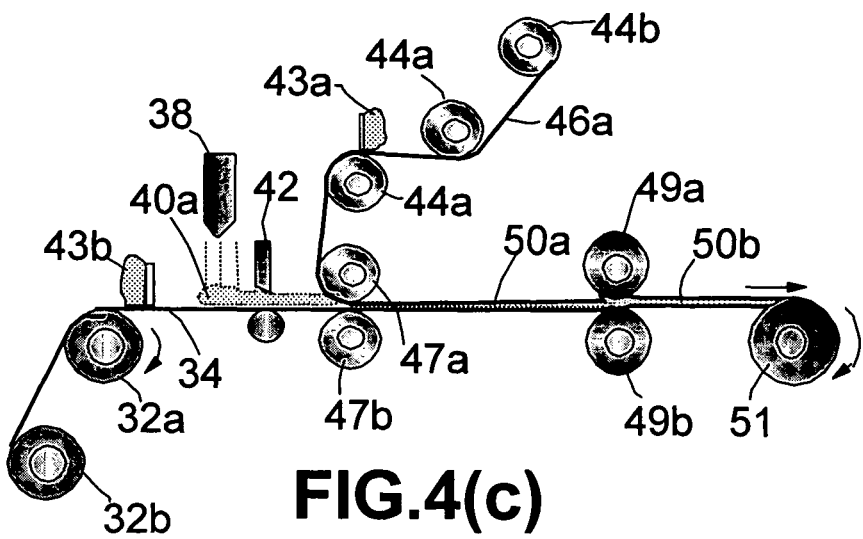
Figure 4D:
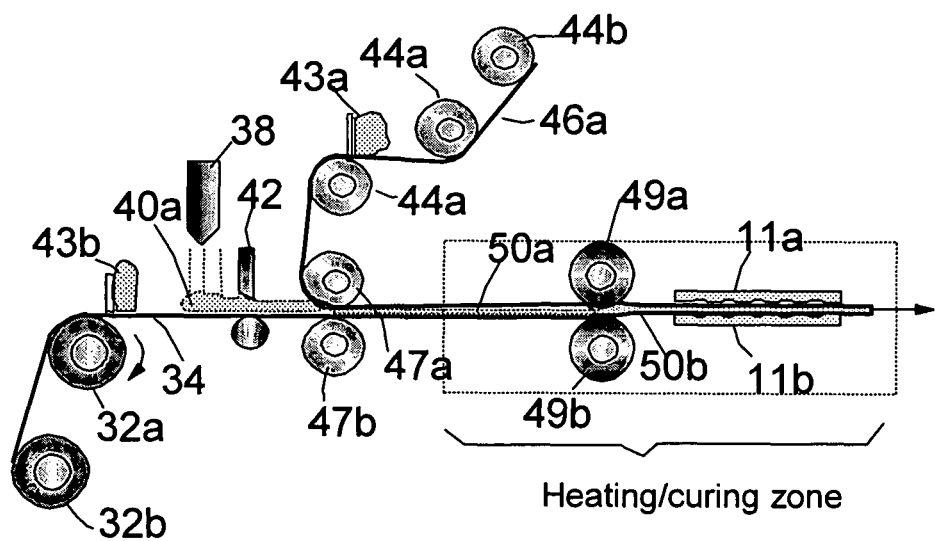

(3) Mixing most (if not all) of the nano-scale filler ingredients (including necessary catalyst, inhibitor, and viscosity adjusters, etc.) to form a resin mixture paste, which is then delivered by the bottom sheet and the top sheet to mix with other remaining ingredients (e.g., chopped fibers) of the conductive filler to form a core layer between the top sheet and bottom sheet, as illustrated in FIG. 4(c) and FIG. 4(d).

In the latter case (FIG. 4(c)), the SMC process consists of chopping fibers 40a onto a sheet of substrate material 34 (flexible graphite, carbon paper, thin metal foil, carbon fiber mat, or plastic film like polyethylene, etc.) on which a resin-filler paste 43b has been doctored. A predetermined amount of this mixture paste 43a, placed on top of another film 46a (flexible graphite), is then conveyed forward to receive the dropping chopped fibers. The "sandwich" of resin mixture and chopped fibers is passed between compaction rolls 47a, 47b to wet the fibers and thoroughly mix the ingredients. Optionally, the mixture is then cured slightly (called aging, maturing, or B-staging) to produce a SMC composition 50b with the resin mixture having a leather-like texture and rolled-up for storage or shipment. The bottom sheet may come from the source roller 32b over a guiding roller 32a and, similarly, the top sheet may come from a source roller 44b over a guiding roller 44a.

Again, a SMC-based flow field plate or bipolar plate can be produced directly in line, as schematically shown in FIG. 4(d). A continuous sheet of SMC is fabricated in a procedure similar to that in FIG. 4(c). Heating means may be used to advance the cure reaction of the thermoset resin (e.g., in a heating zone indicated by a phantom box of FIG. 4(d)) to achieve a desired degree of curing before the SMC is embossed or matched-die molded between a pair of embossing tools 11a,11b or matting mold platens to create the desired flow field channels. These tools or mold platens may also be heated. As the laminated sheet (50a or 50b) continues to move forward, another portion of the sheet is embossed or molded. This is a continuous process that is suitable for cost-effective mass production of flow field plates or bipolar plates that are highly conductive.

Figure 6A:
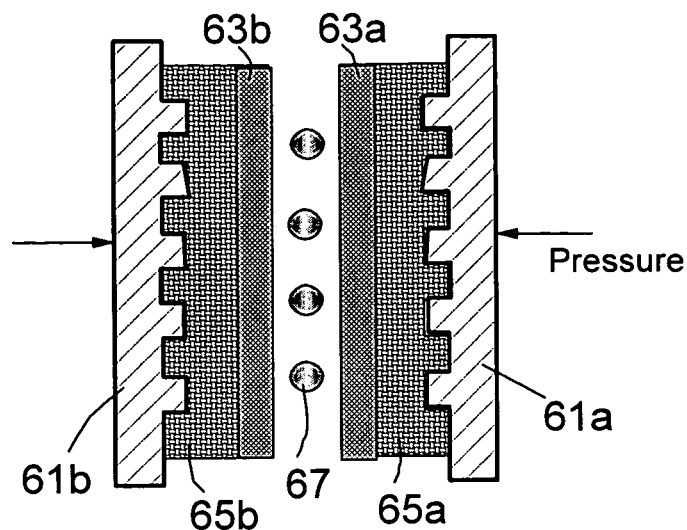
FIG. 6: (a) Schematic of two matting SMC laminates (prior to being fully cured) being molded in a matched-mold pressing process with molding pins being inserted to produce coolant channels; (b) the resulting integral bipolar plate with built-in coolant channels.
Figure 6B:
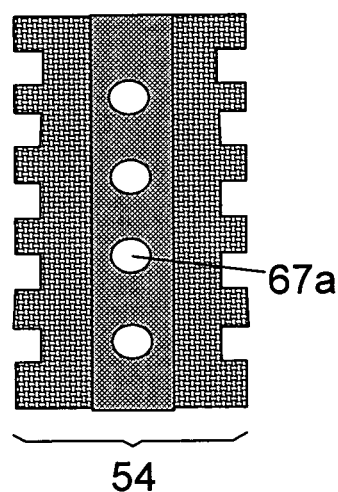
Figure 7:
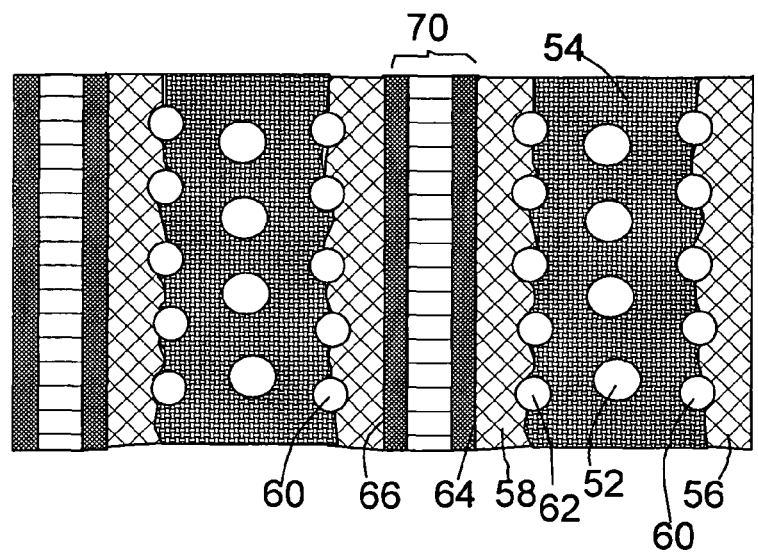
FIG. 7: A sectional view of stacked fuel cells using a series of bipolar plates in accordance with the present invention.

Preferably, coolant channels are built into a bipolar plate when it is molded. For instance, as schematically shown in FIG. 6(a), two uncured or partially cured bi-layer SMC plates (with the plastic film peeled off, leaving behind a resin mixture layer 63a or 63b and flexible graphite layer 65a or 65b) may be molded between a pair of matched molds (61a, 61b) and a number of molding pins 67. These pins, coated with a mold release agent, may be pulled out of the SMC structure to obtain an integral bipolar plate 54 (FIG. 6(b)) with built-in coolant channels 67a. Optionally, coolant channels may be fitted with connectors, preferably before the resin matrix material is solidified. FIG. 7 shows back-to-back flow field plates that are fabricated as one monolithic component 54, with coolant channels 52 formed as complete channels within the component, as well as reactant channels 60 & 62. The two outer surfaces of bipolar plate 54 are stacked against respective diffuser layers 56,58 (preferably made of carbon paper), which are in turn connected to catalyst-coated membrane (e.g., 70).

The present invention also provides a fuel cell or a stack of fuel cells that comprises a highly conductive flow field plate or bipolar plate component as defined in any of the aforementioned preferred embodiments. The resulting fuel cell system is of lower costs (due to their amenability to mass production) and better performance (due to lower contact resistance and internal resistance and, hence, higher voltage).

Conductivity measurements can be made by using the four-point probe method on small-sized plate samples. Table 1 summarizes the parameters and properties of 28 samples prepared in the present study. The results show that the core layer (resin mixture) composition and thickness have a profound influence to the conductivity of the resulting SMC bipolar plates. The thinner the core layer thickness, the higher the plate conductivity. Most of the SMC samples exhibit very impressive electronic conductivity.

TABLE 1

Properties of SMC bipolar plates (flexible graphite resistivity = 0.00333 Ω-cm).

| Sample No. | Core layer resin mixture composition (Weight %) | Top layer thickness $l_1$ (cm) | Core layer resistivity $\rho_2$ (Ω-cm) | Core thickness $l_2$ (μm) | Plate conductivity $\sigma$ (S/cm) |
|---|---|---|---|---|---|
| 1 | 65% Ep, 35% Ag | 0.03 | 0.10 | 1.3 | 282 |
| 2 | 65% Ep, 25% Ag, 10% NGP | 0.03 | 0.11 | 3.2 | 260 |
| 3 | 65% Ep, 25% Ag, 10% GNF | 0.03 | 0.12 | 12 | 191 |
| 4 | 65% Ep, 34% Ag, 1% CNT | 0.03 | 0.11 | 31 | 124 |

TABLE 1-continued

Properties of SMC bipolar plates (flexible graphite resistivity = 0.00333 Ω-cm).

| Sample No. | Core layer resin mixture composition (Weight %) | Top layer thickness $l_1$ (cm) | Core layer resistivity $\rho_2$ (Ω-cm) | Core thickness $l_2$ (μm) | Plate conductivity $\sigma$ (S/cm) |
|---|---|---|---|---|---|
| 5 | 65% Ep, 20% CB, 15% NGP | 0.03 | 0.13 | 55 | 87 |
| 6 | 65% Ep, 35% GP | 0.03 | 0.11 | 78 | 69 |
| 7 | 65% Ep, 25% GP, 10% CF | 0.03 | 0.12 | 120 | 51 |
| 8 | 65% Ep, 30% GP, 5% GL | 0.03 | 0.14 | 220 | 34 |
| 9 | 65% Ep, 25% GP, 10% CF | 0.03 | 0.12 | 310 | 27 |
| 10 | 35% Ep, 35% Ag, 30% NGP | 0.03 | 0.010 | 3.7 | 297 |
| 11 | 35% Ep, 55% Ag, 10% NGP | 0.03 | 0.011 | 5.6 | 294 |
| 12 | 35% Ep, 55% Ag, 10% GNF | 0.03 | 0.012 | 15 | 286 |
| 13 | 35% Ep, 50% Ag, 15% CNT | 0.03 | 0.011 | 33 | 272 |
| 14 | 35% Ep, 40% CB, 25% NGP | 0.03 | 0.013 | 45 | 263 |
| 15 | 35% Ep, 65% GP | 0.03 | 0.011 | 75 | 245 |
| 16 | 35% Ep, 55% GP, 10% CF | 0.03 | 0.012 | 160 | 211 |
| 17 | 35% Ep, 60% GP, 5% GL | 0.03 | 0.014 | 220 | 195 |
| 18 | 35% Ep, 55% GP, 10% CF | 0.03 | 0.012 | 310 | 178 |
| 19 | 50% VE, 50% Ag | 0.03 | 0.021 | 2.3 | 294 |
| 20 | 50% VE, 40% Ag, 10% NGP | 0.03 | 0.023 | 4.6 | 289 |
| 21 | 50% VE, 40% Ag, 10% GNF | 0.03 | 0.024 | 11 | 275 |
| 22 | 50% VE, 44% Ag, 1% CNT | 0.03 | 0.023 | 29 | 243 |
| 23 | 50% VE, 30% CB, 20% NGP | 0.03 | 0.026 | 45 | 222 |
| 24 | 50% VE, 50% GP | 0.03 | 0.023 | 63 | 203 |
| 25 | 50% VE, 40% GP, 10% CF | 0.03 | 0.024 | 88 | 183 |
| 26 | 50% VE, 45% GP, 5% GL | 0.03 | 0.027 | 176 | 140 |
| 27 | 50% VE, 40% GP, 10% CF | 0.03 | 0.024 | 260 | 119 |
| 28 | 50% VE, 40% GP, 10% CF | 0.03 | 0.024 | 320 | 109 |

Note:
Ep = epoxy,
VE = vinyl ester resin,
GP = fine graphite particles,
NGP = nano graphene plate,
CB = carbon black,
CF = carbon fiber,
GL = glass fiber,
GNF = graphitic nano-fiber,
Ag = silver nano particles,
CNT = carbon nano-tubes.

FIG. 8 further illustrates how the overall conductivity of a three-layer bipolar plate depends upon the ratio of the resin mixture layer (or core layer) thickness to the thickness of a flexible graphite sheet (for Samples 1-9, the set of examples that have the highest resin mixture resistivity). With the core layer resistivity slightly fluctuating between 0.10 and 0.14 Ω-cm, a top layer/core layer thickness ratio of approximately 7.5 or higher gives the 3-layer plate a conductivity greater than 100 S/cm. With the top and bottom layer being each 0.3 mm (300 μm) thick, the resin mixture layer is 40 μm or thinner. In order to obtain a bipolar plate conductivity of 200 S/cm, the resin mixture layer has to be lower than 10 μm (further preferably <5 μm). For other two sets of examples (Samples 10-18 and 19-28) given in Table 1, any top layer/core layer ratio from 1/1 to 130/1 is good enough to result in a high bipolar plate conductivity (greater than 100 S/cm). Any ratio greater than 5/1 leads to a plate conductivity greater than 200 S/cm.

These examples have clearly demonstrated the superior electrical conductivity of the presently invented SMC compositions and the SMC-based flow field plate or bipolar plate products. These conductivity values are far superior to those of most of prior art bipolar plates.

What is claimed is:

1. A method for producing a sheet molding compound composition for use as a fuel cell flow field plate or bipolar plate material, said method comprising:

(a) providing a continuous sheet of a substrate material;
(b) feeding a resin mixture to a surface of said substrate material sheet, said resin mixture comprising a thermoset resin and a conductive filler;
(c) providing a continuous sheet of flexible graphite onto said resin mixture in such way that said resin mixture forms a core layer sandwiched between said substrate material sheet and said flexible graphite sheet to obtain a laminated structure; and
(d) compressing said laminated structure to obtain said sheet molding compound composition which is collected on a winding device, the sheet molding compound having a conductivity greater than 100 S/cm.

2. The method as defined in claim 1, wherein said substrate material comprises a flexible graphite sheet.

3. The method as defined in claim 1 wherein said substrate material sheet comprises a carbon paper, carbon or graphite fabric, carbon fiber mat, conductive polymer film, or metal foil.

4. The method as defined in claim 1 wherein said substrate material sheet comprises a plastic film or foil.

5. The method as defined in claim 1 wherein said thermoset resin is selected from the group consisting of unsaturated polyester resins, vinyl esters, epoxies, phenolic resins, polyimide resins, bismaleimide resins, polyurethane resins, and combinations thereof.

6. The method as defined in claim 1 wherein said conductive filler comprises a conductive material selected from the group consisting of carbon fibers, metal fibers, carbon nanotubes, graphitic nano-fibers, nano-scaled graphene plates, carbon blacks, metal particles, and combinations thereof, said conductive material being present in an amount of at least about 3% by weight, based on total weight of said resin mixture.

7. The method as defined in claim 1 wherein said resin mixture core layer has an electrical conductivity no less than 10 S/cm or a layer thickness no greater than 10 μm.

8. The method as defined in claim 1 wherein said resin mixture core layer has an electrical conductivity no less than 50 S/cm or a layer thickness no greater than 60 μm.

9. The method as defined in claim 1 wherein said steps (b) of feeding a resin mixture and (c) of forming a core layer comprise (i) providing a first coating of said thermoset resin or a first amount of a resin mixture paste to a surface of said substrate material sheet and a second coating of said thermoset resin or a second amount of a resin mixture paste to a surface of said flexible graphite sheet, (ii) providing an amount of said conductive filler or selected ingredients of said conductive fillers to a surface of said first coating or to mix with said first paste, and (iii) combining and mixing said first resin coating or first paste, said second resin coating or second paste, and said conductive filler or said selected ingredients.

10. The method as defined in claim 1 wherein said step (b) of feeding a resin mixture comprises spraying said conductive filler and dispensing said thermoset resin, concurrently and/or sequentially, onto said substrate sheet surface.

11. The method as defined in claim 1 wherein said step (d) comprises moving said laminated structure through a desired number of cooperating rollers to facilitate mixing of said resin with said conductive filler.

12. The method as defined in claim 1 wherein said step (c) of providing a continuous sheet of flexible graphite comprises a step of feeding said sheet of flexible graphite from a roller or rotatable drum and said winding device comprises a motorized roller or rotatable drum.

13. The method of claim 1 wherein the conductive filler is present in the resin mixture in an amount greater than 45%.

14. A method for producing a sheet molding compound-based fuel cell flow field plate or bipolar plate, said method comprising:
   (a) providing a continuous sheet of a substrate material;
   (b) feeding a resin mixture to a surface of said substrate material sheet, said resin mixture comprising a thermoset resin and a conductive filler;
   (c) providing a continuous sheet of flexible graphite onto said resin mixture in such way that said resin mixture forms a core layer sandwiched between said substrate material sheet and said flexible graphite sheet to obtain a laminated structure;
   (d) compressing said laminated structure to obtain a sheet molding compound composition having two opposite outer surfaces; and
   (e) impressing a fluid flow channel to either or both of the outer surfaces and curing said thermoset resin to obtain said plate, said plate having a conductivity greater than 100 S/cm.

15. The method as defined in claim 14 wherein said substrate material sheet comprises a flexible graphite sheet and said both outer surfaces were impressed with a fluid flow channel.

16. The method as defined in claim 14 wherein said substrate material sheet comprises a thermoplastic film which is removed before said flow field plate is incorporated as a fuel cell component.

17. The method as defined in claim 14 wherein said thermoset resin is selected from the group consisting of unsaturated polyester resins, vinyl esters, epoxies, phenolic resins, polyimide resins, bismaleimide resins, polyurethane resins, and combinations thereof.

18. The method as defined in claim 14 wherein said conductive filler comprises a conductive material selected from the group consisting of carbon fibers, metal fibers, carbon nano-tubes, graphitic nano-fibers, nano-scaled graphene plates, carbon blacks, metal particles, and combinations thereof, said conductive material being present in an amount of at least about 3% by weight, based on total weight of said resin mixture.

19. The method as defined in claim 14 wherein said step of impressing comprises embossing or matched-die molding.

20. The method as defined in claim 14 further comprising using a molding pin to generate a coolant channel.

21. The method as defined in claim 14 wherein said steps (b) of feeding a resin mixture and (c) of forming a core layer comprise (i) providing a first coating of said thermoset resin to a surface of said substrate material sheet and a second coating of said thermoset resin to a surface of said flexible graphite sheet, (ii) providing an amount of said conductive filler to a surface of said first coating, and (iii) combining and mixing said first resin coating, said second resin coating and said conductive filler.

22. The method as defined in claim 14 wherein said steps (b) of feeding a resin mixture and (c) of forming a core layer comprise (i) providing a first amount of a resin mixture paste to a surface of said substrate material sheet and a second amount of a resin mixture paste to a surface of said flexible graphite sheet, (ii) providing an amount of selected ingredients of said conductive filler to mix with said first amount of paste, and (iii) combining and mixing said first paste, said second paste, and said conductive filler ingredients to form said resin mixture.

23. The method as defined in claim 14 wherein said step (b) of feeding a resin mixture comprises spraying said conductive filler and dispensing said thermoset resin, concurrently and/or sequentially, onto said substrate sheet surface.

24. The method as defined in claim 14 wherein said step (d) comprises moving said laminated structure through a desired number of cooperating rollers to facilitate mixing of said resin with said conductive filler.

25. The method of claim 13 wherein the sheet molding compound has a conductivity of at least 200 S/cm.

26. A method for producing a sheet molding compound-based fuel cell flow field plate or bipolar plate, said method comprising:
   (a) providing a continuous sheet of a substrate material;
   (b) feeding a resin mixture to a surface of said substrate material sheet, said resin mixture comprising a thermoset resin and a conductive filler wherein said conductive filler comprises a conductive material selected from the group consisting of carbon fibers, metal fibers, carbon nano-tubes, graphitic nano-fibers, nano-scaled graphene plates, carbon blacks, metal particles, and combinations thereof, said conductive material being present in an amount of at least about 3% by weight, based on total weight of said resin mixture;
   (c) providing a continuous sheet of flexible graphite onto said resin mixture in such way that said resin mixture forms a core layer sandwiched between said substrate material sheet and said flexible graphite sheet to obtain a laminated structure;
   (d) compressing said laminated structure to obtain a sheet molding compound composition having two opposite outer surfaces; and (e) impressing a fluid flow channel to either or both of the outer surfaces and curing said thermoset resin to obtain said plate, said plate having a conductivity greater than 100 S/cm.

27. The method of claim 14 wherein the conductive filler is present in the resin mixture in an amount greater than 45%.

28. The method of claim 27 wherein the sheet molding compound has a conductivity of at least 200 S/cm.

* * * * *